May 7, 1968 J. P. ANGELLO 3,382,313
COOLING MEANS FOR ELECTRICAL POWER CONVERSION SYSTEM
Filed July 6, 1966
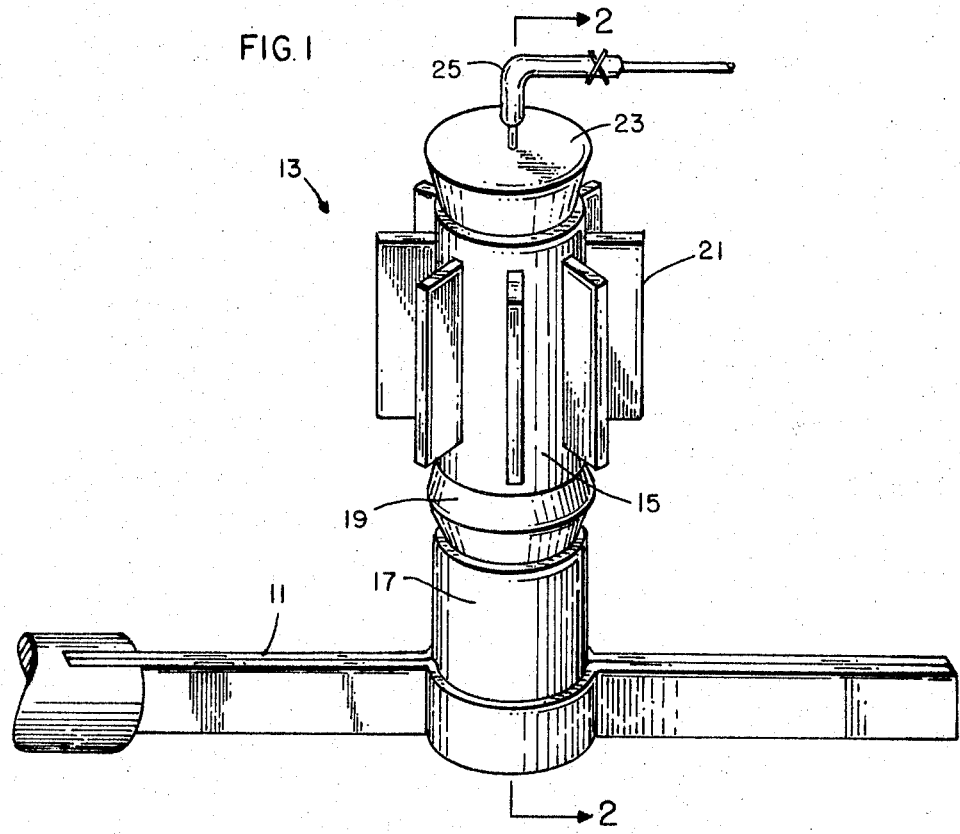
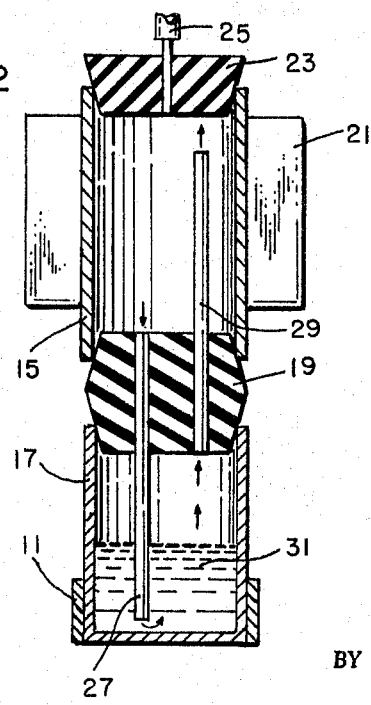
INVENTOR,
JOSEPH P. ANGELLO
BY
ATTORNEYS 3,382,313
COOLING MEANS FOR ELECTRICAL POWER
CONVERSION SYSTEM
Joseph P. Angello, Eatontown, N.J., assignor to the United States of America as represented by the Secretary of the Army
Filed July 6, 1966, Ser. No. 563,656
1 Claim. (Cl. 174—15)

ABSTRACT OF THE DISCLOSURE

This invention contemplates a cooling means for the electrical connector straps of a power conversion system and comprises essentially a dual compartmented sealed tower including a liquid reservoir compartment and a liquid condensation compartment and a pair of oppositely disposed tubes extending through a separator between said compartments.

Specification

The present invention relates generally to thermionic power systems that convert thermal energy to electrical energy. In such systems where the thermionic diodes are connected to a power conditioning equipment, means must be provided for cooling the electrical connector straps without degrading the output of the diode. The low impedance characteristics of a thermionic diode, i.e. high current and low voltage, required that the electrical connector straps be made of a material having low electrical resistivity, e.g. copper, or else a substantial voltage drop will occur across the connector leads at these high current values. This electrical conductor requirement is therefore in conflict with the thermal conduction requirement of having a large temperature gradient established along the connector straps which link the diode feedthrough, which are at a temperature of between 400° C. and 600° C., to the power conditioning equipment, the components of which are limited to operating at a temperature of not more than 70° C.

In the light of the discussion above, the primary feature of the present invention is the provision of a cooling means, including a cooling tower, whereby heat is conducted away from the diode feedthroughs through the connector straps to a point in the strap where the cooling tower is located.

Another feature of the invention is the provision of means within the cooling tower whereby substantially all of the heat is conducted from the strap into the cooling tower. The above and other features and objectives of the invention can best be understood from the following description to be read in conjunction with the drawing in which:

FIG. 1 is a view in perspective of the conductor strap with its associated cooling tower arrangement that is intermediate the thermionic diode and the power conditioning equipment (neither of which are shown); and FIG. 2 is a sectional view of the cooling tower, taken on the line 2—2 of FIG. 1.

Referring to FIG. 1, there is shown a conductor strap 11 which links a thermionic diode and a power conditioning equipment and load, neither of which are shown in the drawings. The cooling means, or tower, of the present invention is designated generally as 13 and comprises essentially an upper compartment 15, a lower compartment 17 and an intermediate separator 19. The lower compartment 17 is a reservoir for a liquid, such as water, but not limited thereto, and is in intimate engagement with the strap conductor 11. The upper compartment 15 serves as a condensation chamber, as will be more fully described hereinafter. The compartment 15 is further provided with a plurality of radially extending fins 21 secured to the outer peripheral surface of the compartment. The upper portion of the compartment 15 is provided with a cover, in the form of a rubber stopper 23, that seals tightly within the compartment. The stopper seal 23 is provided with a passageway through which can be introduced a processing tube 25 provided with an appropriate clamp as shown. The tube 25 is connected to an evacuating pump for use in creating desired vacuum conditions within the entire cooling tower 13.

The internal structure of the tower 13 can best be seen in FIG. 2 where it can be seen that the separator 19 is provided with a pair of spaced channels or passageways. Within one of said passageways is contained a tube 27 which extends downwardly into the reservoir compartment 17 to a depth slightly short of the base of the compartment. Within the other passageway of the separator 19 is confined another tube 29 which extends upwardly into the condensation compartment 15 to a distance just short of the seal stopper 23.

The cooling tower of the present invention as herein described is utilized in the following manner. With the tower 13 in position on the strap 11, the tower is evacuated to make certain that the separator 19 and the seal 23 are adequately sealed. At that time, such vacuum state is purged and a liquid such as water is introduced into the tower to fill the lower reservoir compartment 17 about two-thirds full. Thereafter the tower system is partially evacuated, and after drawing some water vapor out of the tower, the processing tube 25 is clamped to insure sealing of the system.

Under its normal operating condition, the tower 13 is evacuated to such degree that the boiling point temperature of the liquid 31 will be lower than its atmospheric boiling point temperature. In one specific utilization of the system water was used as the fluid in the compartment 17 and the tower 13 was evacuated so that the water would boil at 60° C. at a heat transfer of 30 watts. The temperature of the strap 11 at the diode end, and approximately 3 inches from the tower, was 630° C. At a point approximately one-quarter inch from the tower, at the diode portion, the observed temperature recorded was 95° C. With the cooling system in operation the temperature recorded one-quarter inch to the right of the tower (as viewed in FIG. 1) was 59° C., and at the end of the strap at the power conditioning equipment, the recorded temperature was 56° C.

Functioning of the coling system can be briefly described as follows. Heat is supplied to the compartment 17 through the connector strap 11 to the fluid 31 raising its temperature to the boiling point which is determined by the pressure within the compartment. The additional heat required to vaporize some of the fluid is carried from compartment 17 to compartment 15 through tube 29. This heat is given up in the upper compartment 15 by condensing on the walls of the compartment. Heat is transferred through the walls of the compartment to the fins 21 and dissipated. The condensed fluid is then returned to compartment 17 through tube 27. It appears that certain pressure variations are occurring within the equilibrium limits of the apparatus. At some time in the operation of the cooling system, the pressure in the compartment 15 will be greater than the pressure in the fluid itself, thereby causing the condensation in the compartment 15 to be forced into the lower chamber.

While there has been herein described one specific embodiment of the invention, it will be apparent that changes and modifications may be made therein without departing from the spirit and scope of the invention. For example, in lieu of the rubber separator 19, there may be utilized a permanently secured glass or ceramic separator that is sealed between the compartments by known means. In addition, the seal 23 may be replaced by a permanent metal cap or similar device.

What is claimed is:
1. In a power conversion system: an electrical conductor strap and in combination therewith a cooling means comprising a dual compartmented partially evacuated sealed tower positioned substantially perpendicular to said strap, said tower comprising a reservoir compartment containing a liquid that is in intimate engagement with said strap, a liquid condensation compartment and a separator of electrical insulating material intermediate said reservoir and condensation compartments, said separator having at least two oppositely disposed tubes extending therethrough wherein one of said tubes extends from above the level of the liquid in said reservoir compartment to near the top of said condensation compartment and the other of said tubes extends from the base of said condensation compartment to near the bottom of said reservoir compartment and means maintaining the liquid in the reservoir compartment at a pressure lower than its normal atmospheric pressure.

References Cited

UNITED STATES PATENTS

| | | | |
|---|---|---|---|
| 513,421 | 1/1894 | Rowland | 174—15 |
| 1,754,314 | 4/1930 | Gay | 174—15 |
| 2,883,591 | 4/1959 | Camp | 317—234 |
| 3,085,180 | 4/1963 | Swijsen | 317—100 X |
| 3,143,592 | 8/1964 | August | 174—15 |

FOREIGN PATENTS

| | | |
|---|---|---|
| 284,774 | 2/1928 | Great Britain. |
| 500,133 | 2/1939 | Great Britain. |
| 82,679 | 10/1919 | Switzerland. |

ROBERT A. O'LEARY, *Primary Examiner.*

A. W. DAVIS, *Assistant Examiner.*